United States Patent [19]
Bolte et al.

[11] Patent Number: 5,738,072
[45] Date of Patent: Apr. 14, 1998

[54] DEVICE FOR ACTUATING A CONTROL MEMBER

[75] Inventors: Ekkehard Bolte, Aachen; Leo Bertram, Stolberg; Matthias Wendt, Würselen, all of German Dem. Rep.

[73] Assignee: U.S. Philips Corporation, New York, N.Y.

[21] Appl. No.: 722,129

[22] PCT Filed: Feb. 9, 1996

[86] PCT No.: PCT/IB96/00104

§ 371 Date: Oct. 7, 1996

§ 102(e) Date: Oct. 7, 1996

[87] PCT Pub. No.: WO96/24761

PCT Pub. Date: Aug. 15, 1996

[51] Int. Cl.$^6$ .................. F02D 11/10; G01B 7/30
[52] U.S. Cl. .................. 123/399; 73/118.1; 251/129.04
[58] Field of Search .................. 137/554; 251/129.04; 123/399, 361; 361/139; 73/118.1; 324/207

[56] References Cited

U.S. PATENT DOCUMENTS

| | | | |
|---|---|---|---|
| 4,392,375 | 7/1983 | Eguchi et al. | 73/118 |
| 4,601,271 | 7/1986 | Ejiri et al. | 123/361 |
| 4,809,742 | 3/1989 | Grau | 137/554 |
| 5,257,014 | 10/1993 | Zimmermann | 340/686 |
| 5,513,611 | 5/1996 | Ricouard | 123/399 |
| 5,544,000 | 8/1996 | Suzuki et al. | 361/139 |

FOREIGN PATENT DOCUMENTS 0375050   6/1990   European Pat. Off. .......... H01F 7/14

*Primary Examiner*—Willis R. Wolfe
*Assistant Examiner*—Hieu T. Vo
*Attorney, Agent, or Firm*—Robert M. McDermott

[57] ABSTRACT

The invention relates to a device for actuating a control member, particularly a throttle valve in a gas conduit, such as for example an intake of an internal-combustion engine, which valve is pivotable into operating positions by means of a valve shaft, an actuator being provided, which actuator consists of a rotor body, serving as an actuator body and arranged on the valve shaft, and of an electrically energizable excitation section, which cooperates with said rotor body, and a position sensor detecting angular positions of the valve shaft, which sensor comprises an angular-position generator and an angular-position detector, which are associated with one another and of the two is mounted so as to be rotatable, the valve shaft itself being constructed to carry the angular-position generator or angular-position detector, and the associated part of the position sensor being stationarily mounted on the housing of the device.

4 Claims, 4 Drawing Sheets

DEVICE FOR ACTUATING A CONTROL MEMBER

BACKGROUND OF THE INVENTION

1. Field of the Invention

The invention relates to a device for actuating a control member, particularly a throttle valve in a gas conduit, such as for example an intake of an internal-combustion engine, which valve is pivotable into operating positions by means of a valve shaft, an actuator being provided, which actuator consists of a rotor body, serving as an actuator body and arranged on the valve shaft, and of an electrically energizable excitation section, which cooperates with said rotor body, and a position sensor detecting angular positions of the valve shaft, which sensor comprises an angular-position generator and an angular-position detector, which are associated with one another and of which one of the two is mounted so as to be rotatable.

2. Description of the Related Art

EP 0,375,050 B1 describes a device for actuating a control member, which can be controlled by an electrical controller. The control member is, for example, a throttle valve of the internal-combustion engine of a motor vehicle, which valve is mounted on a valve shaft. The valve shaft carries an actuator body in the form of a magnetized rotor body having two poles. The permanent-magnetic rotor body is cylindrical and cooperates with an excitation section having three pole shoes which surround the rotor body so as to form an air gap. The pole shoes carry windings by which they are energized and which are each powered and controlled separately.

The valve shaft carries a position sensor, which detects the angular positions of the throttle valve by means of an angular-position generator and an angular-position detector and which transfers electric signals marking the throttle-valve positions to the controller. The controller, in its turn, adjusts the desired valve position.

The separate mounting of the position sensor leads to a critical construction because the coupling imposes tight tolerances. The outgoing load-carrying shaft end with the position sensor coupled to it is unfavourable and is liable to cause problems under heavy operating conditions.

SUMMARY OF THE INVENTION

It is an object of the invention to make the use of the position sensor technically and constructionally simpler and more reliable.

According to the invention this object is ed in that the valve shaft itself is constructed to carry the angular-position generator or angular-position detector, and the associated part of the position sensor is stationarily mounted on the housing of the device.

Thus, a position sensor to be installed separately is no longer required and the shaft construction is simplified. Additional assembly and adjustment operations in connection with the mounting of a position sensor are not necessary either. Altogether, the construction is more economical and more reliable.

In a further embodiment of the invention means have been provided to guarantee that the associated parts of the position sensor operate within the required tolerance range under any operating conditions. The means which should guarantee that the associated parts of the position sensor operate within the required tolerance range under any operating conditions first of all include an accurate bearing arrangement of the shaft, so as to minimise radial and axial displacements of the shaft. The shaft should have an adequate resistance to bending.

In a further embodiment of the invention the rotatably mounted part of the position sensor is disposed on the valve shaft at the end which also carries the rotor body. Thus, the position sensor and the actuator, which consists of the excitation section and the rotor body, are disposed at the same side of the actuating device. This is constructionally advantageous and it reduces disturbing influences.

In a further embodiment of the invention the rotatably mounted part of the position sensor is a permanent-magnet body. This is constructionally simple.

In another embodiment of the invention the rotatably mounted part of the position sensor is the permanent-magnet rotor body itself. Thus, the separate magnetic part of the angular-position generator is no longer required.

In a further embodiment of the invention the angular-position detector is disposed in a fixed alignment relative to the associated part of the position sensor on the housing of the actuating device. This results in a more accurate positioning with less adjustment operations.

In a further embodiment of the invention the valve shaft, in the proximity of the freely projecting end, has a mechanical guide constructed in such a manner that it is not in contact with the valve shaft under normal operating conditions but enters into contact and is thus supported under abnormal operating conditions, which support ensures that the displacement of the shaft end remains within the tolerance range. Thus, it is achieved that the valve shaft does not undergo any undesirably large displacements under abnormal conditions, which include bearing defects or vibrations.

In a further embodiment of the invention the valve shaft, in the proximity of the end which carries the rotatable part of the position sensor, is passed freely through a bore in a partition with which the valve shaft is not in contact under normal operating conditions but with which it enters into contact and is thus supported under abnormal operating conditions, which support ensures that the displacement of the shaft end remains within the tolerance range.

In a further embodiment of the invention the bore in the partition keeps the air gap formed by the permanent-magnet rotor body and the electrically energisable excitation section within the tolerate range under abnormal operating conditions.

In a further embodiment of the invention the partition has been constructed so as to provide a physical separation between the permanent-magnet rotor body and the stationary angular-position detector. In this way, extraneous objects, which could affect the operation of the actuator at one side of the partition and the operation of the angular-position generator or its corresponding angular-position generator part, cannot move from one side of the partition to the other side of the partition.

In a further embodiment of the invention the electronic controller of the actuating drive is accommodated inside the housing of the actuating device, and in another embodiment of the invention the stationary angular-position detector forms part of the electronic controller.

BRIEF DESCRIPTION OF THE DRAWINGS

The invention will be described in more detail with reference to the drawings. In the drawings:

FIG. 1 shows a part of an intake port 1 in the intake conduit of, for example, an internal combustion engine. A throttle valve 4 is mounted in the inner space 3 of the tubular port 1. The throttle valve 4 is mounted on a valve shaft 5 which extends diametrally through the tubular inner space 3. In FIG. 1 the throttle valve 4 is in the limp-home position. This is a position which still allows emergency operation. The valve shaft 5 is journalled in a flange 6 of the port 1 by means of bearings 7.

Figure 1:
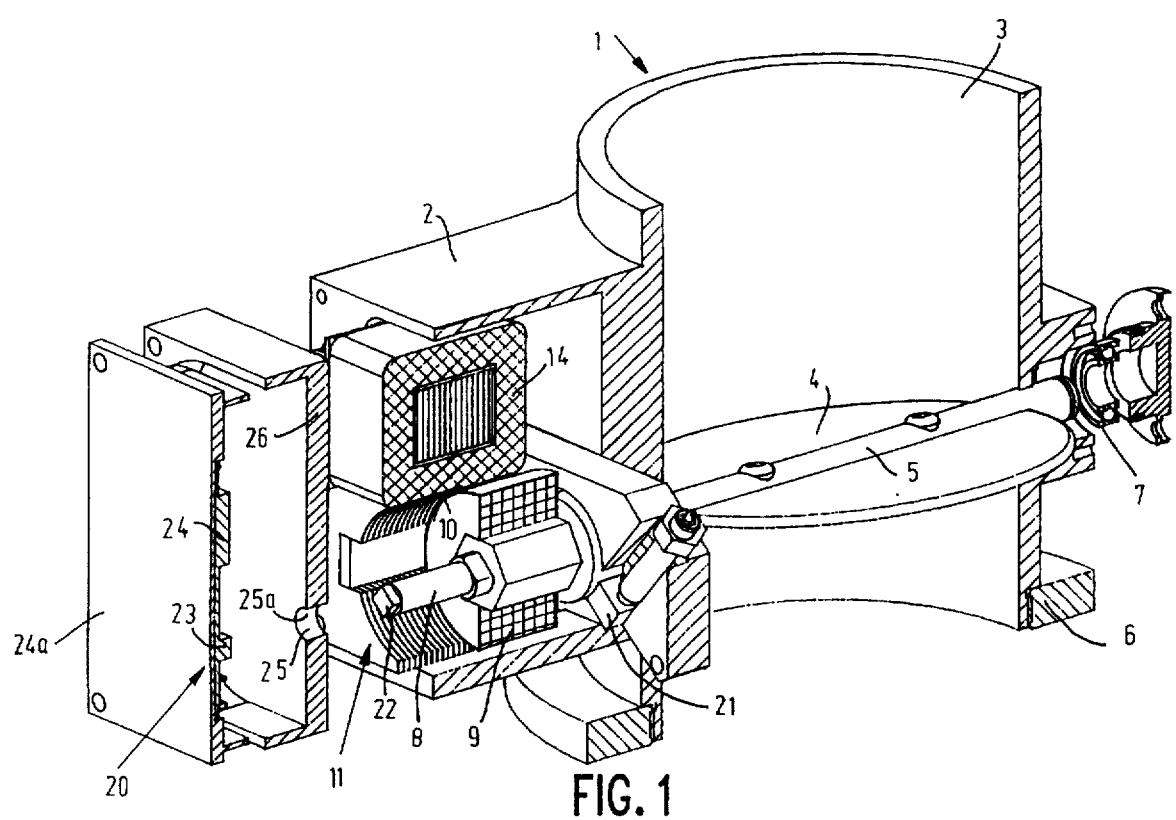
FIG. 1 is a diagrammatic partly sectional and exploded view showing the intake port of an internal combustion engine with a throttle valve mounted in said intake port, with a device for actuating the throttle valve, and with a position sensor arrangement.

The valve shaft 5 has one outgoing shaft end 8 carrying a cylindrical magnetic rotor body 9. The magnetic rotor body 9 is to be understood to mean a rotatable member which is capable of rotation in an air gap 10 and which is of the permanent-magnet type or is electrically magnetizable. In the present embodiment a permanent-magnet rotor body is preferred. The permanent-magnet rotor body 9 is disposed in the air gap 10 of an excitation section 11. This excitation section 11 comprises a U-shaped iron stator and an excitation winding 14. The excitation section 11 is accommodated in a housing 2 of the flange 6.

Figure 2:
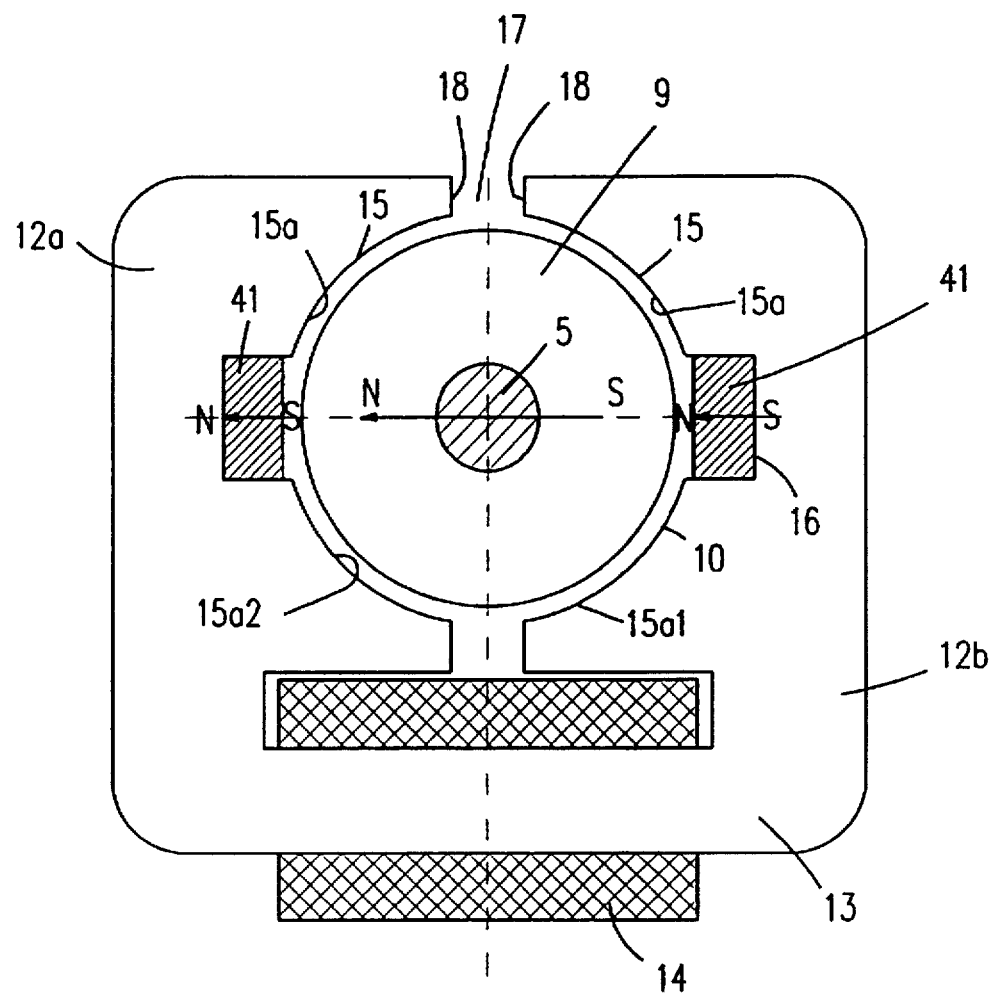
FIG. 2 is a sectional view of the actuator of the device for actuating the throttle valve.

FIG. 2 is a sectional view showing the permanent-magnet rotor body 9 and the excitation section 11, which together form an actuator, in the non-energized condition. The permanent-magnet body 9 has two poles, i.e. a north pole N and a south pole S. The excitation section 11 is made of a high-permeability material such as iron, steel, sintered iron or of magnetic-steel laminations and it is U-shaped with two limbs 12a and 12b interconnected by a base 13. The base 13 carries the excitation winding 14 between the limbs 12a, 12b.

Both limbs 12a, 12b are constructed as pole shoes 15 having pole arcs 15a, which externally bound the air gap 10. These pole arcs 15a are interrupted by slots 16 substantially in their centres. These slots 16 have substantially the same magnetic effect as the gaps 17 between facing pole shoe ends 18. This results in diametrally opposed pole arc portions 15a1 and 15a2 at opposite sides of the central slots 16. The air gap 10 has continuously the same width but may also have a varying width; for example, between the pole-arc portion 15a1 and the rotor body 9 this width may on the average be smaller than between the pole-arc portion 15a2 and the rotor body 9, assuming that the rotor body 9 is circularly cylindrical with a constant diameter.

The rotor body 9 and the excitation section 11 have been dimensioned so as to obtain a device with a large restoring torque. This large restoring torque is provided by the permanent magnets 41 arranged in the slots 16. If required, the detent torque can also be increased by slot extensions. In the limp-home position, i.e. a position defined by a stop 21 when the coil 14 is not energized, a strong magnetic field is provided by the permanent magnets 41, which have been magnetized in the same diametral direction, which field draws the rotor body 9, which has also been magnetized diametrally, into the limp-home position. In principle, the rotor body 9 tends to rotate out of the position shown in FIG. 2, namely under the influence of the field of the auxiliary magnets and its own field. However, in the assembled condition the rotor body does not reach this position because the stop 21 prevents it from reaching the position shown in FIG. 2; it remains in the limp-home position. In the device there are two corresponding torques. One torque is the restoring magnetic torque, which acts towards the stop and is produced by the permanent magnets 41 in conjunction with the rotor body 9. The other torque is an electromagnetic torque, which is produced in conjunction with the rotor body 9 when the excitation winding 14 is energized and which draws the throttle valve 4 into the desired open position. The operation of the mechanism corresponds to that of a mechanism with a mechanical return spring and completely replaces this return spring. As a result, the device becomes very simple both mechanically and electrically.

FIG. 1 is an exploded view showing a position sensor 20 of the device with its component parts. Tiffs position sensor 20 comprises an angular-position generator 22 arranged on the end face of the outgoing free shaft end 8. This angular-position generator 22 cooperates with an angular-position detector 23. This angular-position detector 23 forms part of an electronic controller 24 which is provided on a board 24a. In the embodiment shown in FIG. 1 the shaft end 8 passes freely through a bore 25 in a partition 26. The partition 26 is fixedly mounted on the housing 2 in the assembled situation. Under normal operating conditions the shaft end 8 of valve shaft 5 is not in contact with the bore wall 25a, i.e. with the partition 26. However, if the valve shaft 5 bends as a result of abnormal operating conditions, the shaft end 8 will come into contact with the bore wall 25a under such abnormal operating conditions and will be supported. This support ensures that the displacement of the shaft end 8 remains within the tolerance range. If the electronic controller 24 is fixedly mounted to the partition 26 there will be a fixed relationship in the position of the angular-position generator 22 and the angular-position detector 23 relative to one another. This fixed relationship is also guaranteed by means of the guidance in the bore 25, which does not allow a displacement of the angular-position generator 22 outside a tolerance range. An additional advantage of the free guidance of the shaft end 8 in the bore 25 is that in the event of abnormal operating conditions the air gap formed between the permanent-magnet rotor body 9 and the electrically energisable excitation section 11 is also kept within the tolerance range. A further advantage of the partition 26 is that parts which come loose at one of the two sides of the partition 26 cannot reach the other side of the partition 26. This provides a complete separation between the excitation section 11 and the electronic controller 24.

Figure 3:
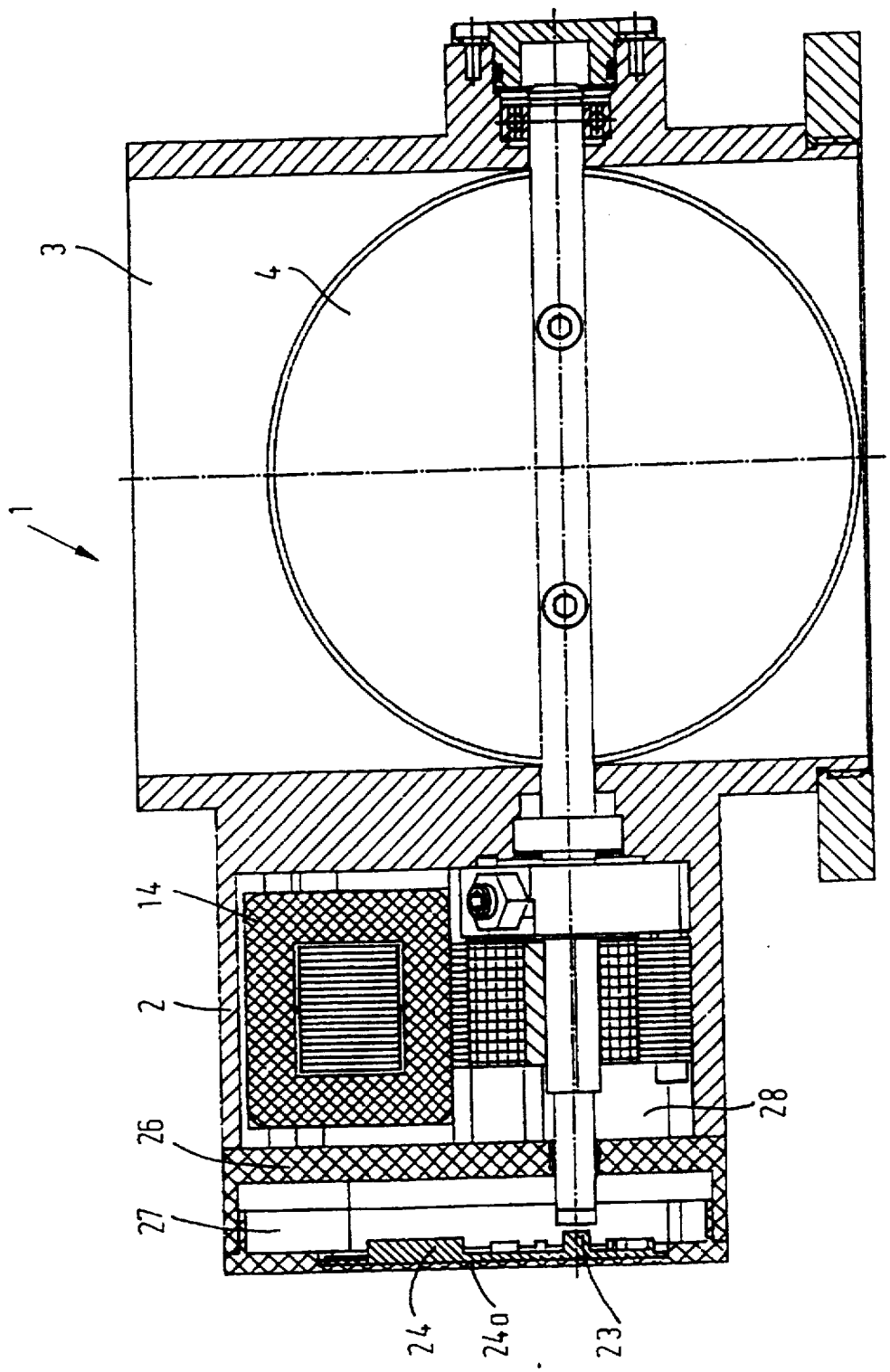
FIG. 3 shows the device of FIG. 1 with the position sensor mounted and the throttle valve in the open position.

FIG. 3 is a sectional view of the device shown in FIG. 1, in which the throttle valve 4 has been rotated into its open position by energization of the excitation winding 14. FIG. 3 shows how the electronic controller 24 on the wall 24a has been fixedly connected to the housing 2. The space 27 adjacent the electronic controller 24 is bounded by the partition 26. The partition 26 provides a physical separation between the space 28 in which the actuator 11a is situated and the space 27 adjacent the electronic controller 24.

Figure 4:
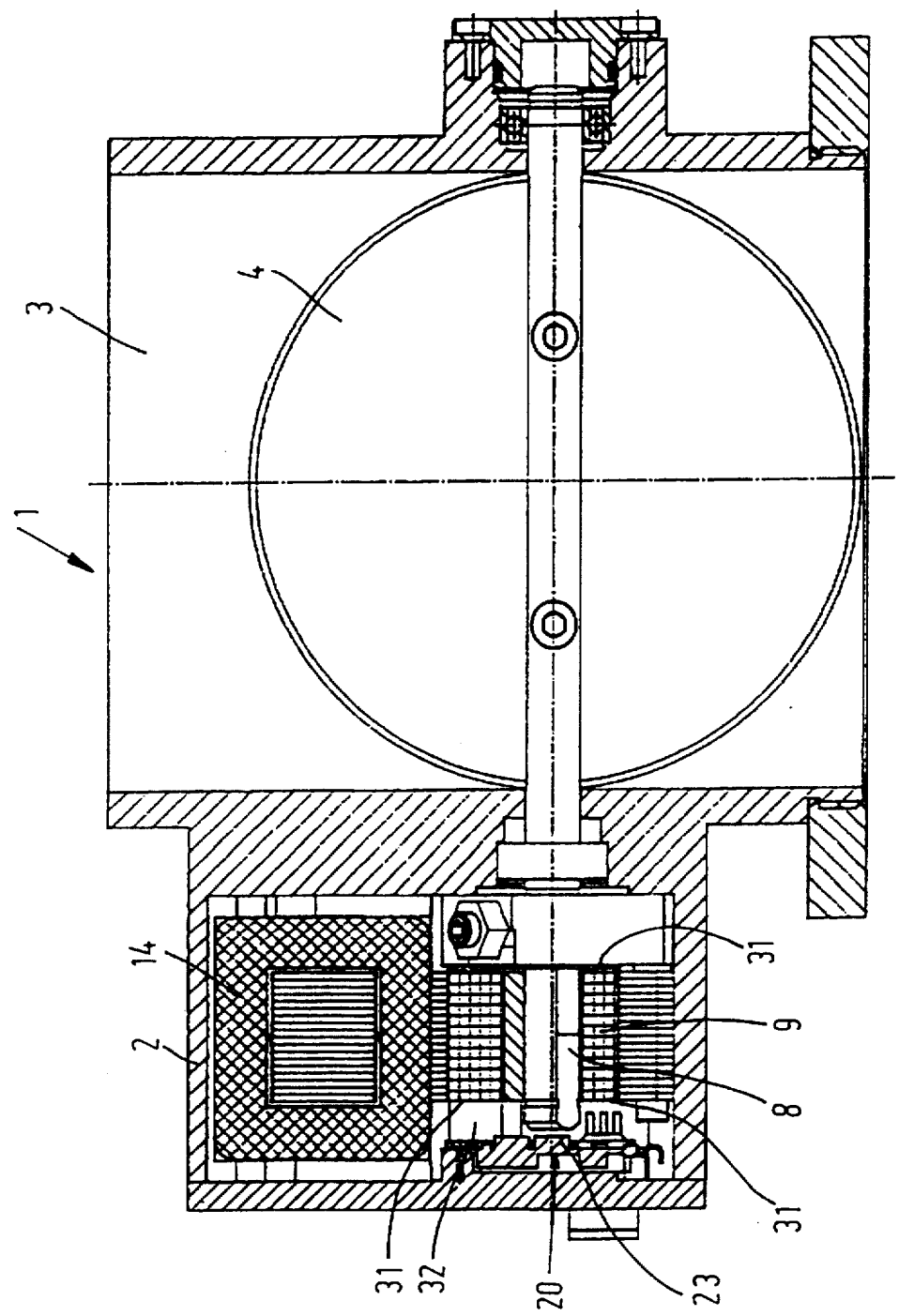
FIG. 4 is a sectional view showing the intake port with the throttle valve with a modified position sensor arrangement.

FIG. 4 shows the device and the position sensor in another embodiment in which the angular-position generator 22 on the shaft end 8 has been dispensed with. Its function is taken over by the permanent-magnet rotor body 9. The rotor body 9 has a magnetic stray field formed at its end faces 31 and extending into a space 32 at the outer end face 31. In this space 32 the angular-position detector 23 is still disposed within the stray field of the rotor body 9. The operation corresponds to that of the device shown in FIG. 1.

A thin partition, not shown, may extend through the space 32 to provide the desired separation between the elements of the electronic controller 24 and the actuator 11a. This thin partition should be made of a non-magnetic material.

We claim:

1. A device for actuating a control member, particularly a throttle valve (4) in a gas conduit (3), such as for example an intake of an internal-combustion engine; which valve is pivotable into operating positions by means of a valve shaft (5), said valve shaft having at least one freely projecting end (8), said device comprising:

a housing (2), an actuator, which actuator comprises:

a rotor body, serving as an actuator body (9) and arranged on the valve shaft (5), and an electrically energizable excitation section (11), which cooperates with said rotor body, and a position sensor (20) for detecting angular positions of the valve shaft (5), which comprises a pair of angular-position elements, one of which being an angular-position generator (22) and the other of which being an angular-position detector (23), one of the angular-position elements being carried on the valve shaft, and thus being rotatable, the other of the angular-position elements being stationarily mounted on the housing (2) of the device, characterized in that the valve shaft (5), in the proximity of the freely projecting end (8), has a mechanical guide (25) constructed in such a manner that the mechanical guide (25) is not in contact with the valve shaft (5) under normal operating conditions but enters into contact and thus supports the valve shaft (5) under abnormal operating conditions, which support ensures that the displacement of the shaft end remains within a tolerance range.

2. A device as claimed in claim 1, further characterized in that the mechanical guide (25) comprises a bore in a partition (26), through which bore passes the freely projecting end (8) of the valve shaft (5).

3. A device as claimed in claim 2, characterized in that the bore (25) in the partition (26) keeps an air gap (10) formed by the permanent-magnet rotor body (9) and the electrically energizable excitation section (11) within the tolerance range under abnormal operating conditions.

4. A device as claimed in claim 3, characterized in that the partition (26) has been constructed so as to provide a physical separation between the permanent-magnet rotor body (9) and the stationary angular-position element.

* * * * *

UNITED STATES PATENT AND TRADEMARK OFFICE
CERTIFICATE OF CORRECTION

PATENT NO.  : 5,738,072
DATED       : April 14, 1998
INVENTOR(S) : Bolte et al.

It is certified that error appears in the above-indentified patent and that said Letters Patent is hereby corrected as shown below:

On the title page:

Add --[30]    Foreign Application Priority Data

February 10, 1995    [DE] German Pat. Off.   19504324.3--.

Signed and Sealed this

Twenty-eighth Day of July, 1998

*Attest:*

BRUCE LEHMAN

*Attesting Officer*     *Commissioner of Patents and Trademarks*